Patented Feb. 13, 1934

1,947,226

UNITED STATES PATENT OFFICE 1,947,226

PROCESS FOR MAKING TITANIUM WHITE

Hartmut W. Richter, Elizabeth, N. J.

No Drawing. Application September 9, 1932
Serial No. 632,392

6 Claims. (Cl. 23—202)

This invention relates to the recovery of $TiO_2$; and it comprises an improvement in methods of recovering $TiO_2$ by hydrolysis of difficultly hydrolyzable sulfuric acid solutions of $TiO_2$ made in ordinary ways wherein an addition is made of a special sulfuric acid solution of $TiO_2$ to such a solution; said special solution being made by decomposing sodium metatitanate with water and taking up the $TiO_2$ residue in the least quantity of sulfuric acid necessary to give good extraction; all as more fully hereinafter set forth and as claimed.

White pigments composed of, or containing, titanium dioxid, $TiO_2$, or "titanic acid" are commercially produced and find favor because of their brilliant whiteness, opacity and good covering power. They are however expensive to produce as compared with competitive white pigments and improvements in details of manufacture lowering the cost are unusually important. The raw material is generally rutile, an impure native form of $TiO_2$, although sometimes titaniferous iron ores and minerals, such as menaccanite, ilmenite, etc., are used. In all methods the mineral is "opened up" in some way and the $TiO_2$ finally occurs in solution in sulfuric acid. The described processes are often rather intricate; but the final result is usually a sulfuric acid solution containing $TiO_2$.

Sulfuric acid solutions of $TiO_2$ when heated undergo internal changes, or "hydrolysis", as it is termed, with production of a white precipitate. In the art this fact is utilized in making titanium pigments. A precipitate is made by hydrolyzing such a sulfuric acid solution in an autoclave and it is separated from the mother liquor, washed, purified and calcined to give a commercial pigment. The particular temperature required in hydrolysis varies with the acid solution used; with the ratio of sulfuric acid to $TiO_2$, with the amount of water present and with the character of the $TiO_2$ occurring in solution. Titanium dioxid is rather inert chemically; a fact to which it owes much of its value as a permanent white pigment; but some samples are more inert than others and vary in their relations to sulfuric acid and water. This is probably due to differences in the degree of polymerization; that is, regarding the formula as $(TiO_2)_n$, the value of $n$ varies. These differences apparently persist to a greater or less extent when titanium dioxid is brought into solution with acid. Artificially made, fresh hydrated $TiO_2$ can be brought into solution with comparatively small proportions of strong sulfuric acid; and hydrolysis can be effected at temperatures which are not high. On the other hand highly mineralized forms of $TiO_2$, such as ilmenite, rutile, etc., require large proportions of strong acid at high temperatures for solution; and hydrolysis must also be at high temperatures.

Operating under the present invention heating in an autoclave is no longer necessary; hydrolysis can be secured with the sulfuric acid solution of $TiO_2$ at boiling heat under atmospheric pressure.

While many methods of opening up titaniferous ores and minerals have been proposed, in general fine ground material is digested with hot strong sulfuric acid. In one method, rutile is heated with strong sulfuric acid at 165° to 175° in an open digester at atmospheric pressure. This permits escape of water vapor in the event the acid is not originally of full strength. After a time the digester is closed and heating continued with the concentrated acid, the temperature going up to 200°–225° C. When reaction is apparently complete, the reaction mixture is cooled, water is added and a diluted acid solution is obtained containing most, but not all, of the titanium. Much $TiO_2$ ordinarily remains in the solid residue which is removed as press cake and is discarded. Instead of using rutile, the treatment may be applied to a $TiO_2$ concentrate obtained by furnace reduction of ilmenite, etc., removal of the reduced iron with dilute sulfuric acid and washing; this concentrate being handled as described for rutile.

The diluted acid solution obtained as described, which contains 20 per cent or less $H_2SO_4$, is next heated under pressure in a lead lined autoclave; the temperature being around 160° C. and the pressure being of the order of 70 pounds. Hydrolysis occurs. The precipitate is washed to remove most of the sulfuric acid, drained, dried and calcined, furnishing a marketable white pigment.

In these methods of the usual art, the yields are not particularly good and the consumption of acid is rather large. The residual acid after hydrolysis is dilute and impure. Hydrolysis is almost invariably accomplished in an autoclave at a temperature around 160° to 180° C. and requires a long period of heating. Apparatus withstanding hot sulfuric acid at high temperatures under pressure is not cheap; and this autoclave heating adds considerably to the cost of making white titanium pigments. Nevertheless in obtaining $TiO_2$ from the acid solution resulting from opening up rutile and ilmenite in the ordinary ways this high temperature, long continued autoclave treatment is regarded as necessary.

I have found that the time of hydrolysis of these solutions can be considerably abbreviated and lower temperatures made possible by admixing some amount of a sulfuric acid solution of a more reactive form of $TiO_2$; hydrated $TiO_2$ produced at low temperatures. The action is, possibly "catalytic"; or it may be due to crystallization phenomena, to production of nuclei, etc. Whatever the explanation, the fact is as stated.

Reactive $TiO_2$ suitable for my purpose can be obtained in a simple manner by a caustic soda treatment of non-reactive forms. Most kinds of hydrolytically produced $TiO_2$ react with caustic soda at a temperature below the point of fusion of the caustic to give sodium metatitanate; a body which is broken up by cold water, releasing $TiO_2$ in an insoluble hydrated reactive condition and giving a solution of caustic soda. About 90 per cent of the soda is regained as a dilute solution which can be reconcentrated and used again. Some soda stays in the washed $TiO_2$ and this can be extracted with cold dilute sulfuric acid, or, for the present purpose, simply allowed to remain. The $TiO_2$, washed or unwashed, is readily taken up by a small amount of hot strong $H_2SO_4$. It is not difficult to prepare solutions having a ratio of $H_2SO_4$ to $TiO_2$ less than 2.2:1; the ratio often going as low as 1.5:1 or 1.8:1. These solutions on boiling under atmospheric pressure, that is, at around 100° C., readily and completely deposit their $TiO_2$ in good pigmentary form. The action as so far described may be used in purifying crude $TiO_2$ precipitates obtained by usual methods.

Sulfuric acid solutions obtained as just described not only hydrolyze readily as stated per se, but impart ready hydrolyzability to the usual sulfuric acid solutions of titanium obtained in the prior art. A minor admixture of this special solution with an ordinary solution renders the latter capable of hydrolysis in a shorter time and at a lower temperature than is the case without the addition. Sulfuric acid solutions made according to processes of the prior art and per se hydrolyzing only at a temperature of, say, 160° C. and under pressure, upon the addition of a sufficient amount of the special solution described, preferably in an amount of 5 per cent or more, give mixtures yielding an almost complete precipitation of $TiO_2$ by simple boiling for 4 to 6 hours under atmospheric pressure. The $TiO_2$ obtained is of excellent pigmentary quality.

While I have described the production of these catalytic solutions by a special treatment of artificially produced $TiO_2$ it is possible to produce like solutions from rutile in a more direct manner. In another and copending application, Ser. No. 474,880, I have described and claimed a method of opening up rutile wherein fine powdered rutile is mixed with strong caustic soda solution, the mixture dried and then heated to a temperature below that at which fusion takes place. In so doing, I find that the rutile is opened up and on cooling the reaction mixture and covering with water, caustic soda goes into solution, as before, leaving a residue containing hydrated $TiO_2$ in the described active form. This residue may or may not be washed with a little weak, cold sulfuric acid to get rid of remaining soda. Whether washed or unwashed, it is dissolved in hot 50 per cent sulfuric acid to give a reactive solution. This reactive solution can be used in the present process in lieu of the specially made solution described ante.

In a specific embodiment of my invention, I took a batch of 500 gallons of a solution of $TiO_2$ made by high temperature digestion of ilmenite with concentrated sulfuric acid in a manner usual in the art. This batch contained about 834 pounds of $TiO_2$ and 1830 pounds of $H_2SO_4$; an $H_2SO_4:TiO_2$ ratio of 2.2:1. This solution was one which could ordinarily be hydrolyzed economically only by heating to temperatures around 160° and at high pressure. On boiling the solution at atmospheric pressure for 6 hours, some $TiO_2$ was precipitated, but the yield was only 8 per cent of theory.

In making the described catalytic solution to be added to the stated batch, a mixture of rutile and caustic soda was roasted below the melting point, leached to remove soda and the $TiO_2$ extracted by treating the washed mixture with sulfuric acid of 50 per cent strength. Merely enough acid was used to give a good extraction of $TiO_2$. Of the resulting solution, I took 100 gallons, which contained about 167 pounds of $TiO_2$ and 251 pounds of $H_2SO_4$ in that quantity. The $H_2SO_4:TiO_2$ ratio was 1.5:1. On mixing one part of this with five parts of the first solution and boiling the mixture for 6 hours at atmospheric pressure, there was a yield of 2250 pounds of a heavy precipitate of good quality of hydrated titanium dioxid, suitable for pigments after the usual washing and calcination. The yield of washed, calcined titanium dioxid was 900 pounds or 90 per cent of the theory.

What I claim is:—

1. In the hydrolysis of highly acid solutions of titanium dioxid in sulfuric acid to produce a precipitate suitable for conversion into pigment the method of lowering the temperatures and pressures necessary for hydrolysis which comprises adding to such a highly acid solution a solution of more basic titanium sulfate containing sulfuric acid and $TiO_2$ in a weight ratio of less than 1.8:1.

2. In the process of claim 1, adding a titanium sulfate solution containing sulfuric acid and $TiO_2$ in a weight ratio between 1.5:1 and 1.8:1.

3. In the preparation of pigmentary $TiO_2$ by hydrolysis of difficultly hydrolyzable acid solutions of titanium dioxid in sulfuric acid the improvement which comprises adding to such a difficultly hydrolyzable solution a less volume of a less acid solution of $TiO_2$ in sulfuric acid prepared from fresh and reactive $TiO_2$; and boiling the mixture under atmospheric pressure from 4 to 6 hours.

4. The method of precipitating $TiO_2$ from sulfuric acid solutions containing more than 2.2 parts of $H_2SO_4$ per part of $TiO_2$ which comprises adding to such a solution various amounts of a basic titanium sulfate solution, containing less than 1.8 parts of $H_2SO_4$ per part of $TiO_2$ and boiling the mixture at atmospheric pressure.

5. In the process of claim 1, heating the mixture of solutions to be hydrolyzed in a closed container under pressure.

6. In the process of claim 1, heating the mixture of solutions to be hydrolyzed in an open container at atmospheric pressure.

HARTMUT W. RICHTER.